(12) United States Patent
Funahashi

(10) Patent No.: US 9,683,296 B2
(45) Date of Patent: Jun. 20, 2017

(54) METHOD AND APPARATUS FOR CONTROLLING STEEL CORROSION UNDER THERMAL INSULATION (CUI)

(71) Applicant: MUI Co., West Chester, PA (US)

(72) Inventor: Miki Funahashi, West Chester, PA (US)

( * ) Notice: Subject to any disclaimer, the term of this patent is extended or adjusted under 35 U.S.C. 154(b) by 252 days.

(21) Appl. No.: 13/788,563

(22) Filed: Mar. 7, 2013

(65) Prior Publication Data
US 2014/0251792 A1    Sep. 11, 2014

(51) Int. Cl.
| | | |
|---|---|---|
| C23F 13/00 | (2006.01) | |
| C23F 13/06 | (2006.01) | |
| C23F 13/08 | (2006.01) | |
| F16L 58/08 | (2006.01) | |

(52) U.S. Cl.
CPC .............. *C23F 13/06* (2013.01); *C23F 13/08* (2013.01); *F16L 58/08* (2013.01); *C23F 2213/32* (2013.01)

(58) Field of Classification Search
CPC .......... C23F 13/02; C23F 13/08; C23F 13/10; C23F 13/18; C23F 2213/21; C23F 2213/30; C23F 2213/31; C23F 2213/32; C23F 13/06; C23F 13/16
USPC ....................... 204/196.01, 196.37
See application file for complete search history.

(56) References Cited

U.S. PATENT DOCUMENTS

| | | | |
|---|---|---|---|
| 2,498,493 A | 2/1950 | Hickernell | |
| 3,202,596 A | 8/1965 | Canevari | |
| 3,260,661 A | 7/1966 | Kemp et al. | |
| 3,475,213 A | 10/1969 | Stow | |
| 3,505,144 A | 4/1970 | Kilduff et al. | |
| 3,770,570 A | 11/1973 | Swearingen et al. | |
| 4,010,315 A | 3/1977 | Mildner | |
| 4,287,034 A * | 9/1981 | Pieslak et al. | ................ 205/735 |
| 4,288,492 A | 9/1981 | Hiromae et al. | |
| 4,496,444 A | 1/1985 | Bagnulo | |
| 4,645,697 A * | 2/1987 | Torigoe | ................... C23F 13/02 |
| | | | 138/103 |
| 4,812,212 A | 3/1989 | Dimond et al. | |

(Continued)

FOREIGN PATENT DOCUMENTS

| | | |
|---|---|---|
| WO | WO-94/04354 | 3/1994 |
| WO | WO-99/50478 | 10/1999 |

*Primary Examiner* — Luan Van
*Assistant Examiner* — Alexander W Keeling
(74) *Attorney, Agent, or Firm* — John G. Posa; Belzer PC

(57) ABSTRACT

Galvanic anodes and barrier corrosion control for metal pipelines, tanks, and equipment under thermal insulation includes the use of pure aluminum and aluminum alloys in fresh water at high temperatures to protect steel elements in hot water without sufficient chlorides. Sacrificial aluminum and sacrificial zinc-aluminum powders in a mixed primer provide long-term, effective corrosion control of steel under thermal insulation can be achieved in all water temperature ranges regardless of the presence of sufficient chlorides. At temperatures below 75° C., the zinc particles in the primer act to protect the substrate steel. At temperatures above 75° C., the aluminum particles in the primer, and galvanic aluminum tape protect the substrate steel in chloride free neutral pH water and also reduce the consumption of zinc particles in the primer. When the electrolyte water for CUI is sufficiently contaminated with chlorides, the aluminum particles in the primer and the galvanic aluminum become active.

9 Claims, 2 Drawing Sheets

(56) References Cited

U.S. PATENT DOCUMENTS

| | | | |
|---|---|---|---|
| 4,855,024 A | 8/1989 | Drachnik et al. | |
| 5,292,411 A | 3/1994 | Bartholomew et al. | |
| 5,341,562 A * | 8/1994 | Furuya | C23F 13/06 |
| | | | 205/731 |
| 5,411,646 A | 5/1995 | Gossett et al. | |
| 5,650,060 A | 7/1997 | Huang et al. | |
| 5,779,632 A | 7/1998 | Dietz et al. | |
| 5,879,817 A | 3/1999 | Brown, Jr. et al. | |
| 6,022,469 A | 2/2000 | Page | |
| 6,120,675 A | 9/2000 | Hill et al. | |
| 6,193,857 B1 | 2/2001 | Davison et al. | |
| 6,200,397 B1 | 3/2001 | Allen | |
| 6,303,017 B1 | 10/2001 | Page et al. | |
| 6,332,971 B1 | 12/2001 | Hill | |
| 6,562,229 B1 | 5/2003 | Burgher et al. | |
| 6,973,244 B2 | 12/2005 | Karlsen | |
| 7,338,591 B2 | 3/2008 | Vaelitalo | |
| 7,749,362 B2 | 7/2010 | Glass et al. | |
| 7,879,204 B2 | 2/2011 | Funahashi | |
| 7,905,993 B2 | 3/2011 | Funahashi | |
| 7,964,067 B2 | 6/2011 | Funahashi | |
| 2004/0238376 A1 | 12/2004 | Whitmore | |
| 2009/0127132 A1 | 5/2009 | Funahashi | |
| 2011/0177358 A1* | 7/2011 | Horton et al. | 428/640 |
| 2011/0221151 A1* | 9/2011 | Sakamoto et al. | 280/124.1 |

\* cited by examiner

METHOD AND APPARATUS FOR CONTROLLING STEEL CORROSION UNDER THERMAL INSULATION (CUI)

FIELD OF THE INVENTION

This invention relates generally to corrosion control and, in particular, to the use of galvanic anodes and barrier corrosion control for metal pipelines, tanks, and equipment under thermal insulation, including the use of pure aluminum and aluminum alloys in fresh water at high temperatures to protect steel elements in hot water without sufficient chlorides.

BACKGROUND OF THE INVENTION

The corrosion of steel pipes, tanks and other equipment under thermal insulation has been a significant problem in the petrochemical, refinery and other industries. A highly effective corrosion control method is required due the presence of corrosive electrolytes, high temperature resistance and the need for long term reliability since corrosion under insulation (CUI) cannot be visually inspected without removing the insulation material. The significantly high costs of corrosion inspection and repairs may result in a huge financial burden to the owners due to the accessibility, the requirement of the thermal jacket removal and re-installation, and manufacturing downtime. When the corrosion problems are ignored, serious accidents may occur, and the frequency of such accidents has been increasing recently worldwide.

The causes of CUI are typically caused by the intrusion of rain water, deluge system water, wash water, or condensation. The insulation system should be water tight; however, the failure of water tightness occurs in some areas, resulting in water intrusion. The facilities are typically located near oceans, so that the rain water is contaminated with chlorides. The petrochemical factories also release sulfates into the air, so that rain water may also be contaminated with sulfates.

When the corrosive contaminated water penetrates under the insulation and contacts high-temperature steel pipes, tanks and equipment, the water evaporates and leaves corrosive contaminants. Further water intrusion increases the concentration of the substances under the thermal insulator. In addition, condensation on cold pipelines, or cyclic hot-and-cold pipelines, is another source of the CUI electrolyte. The intrusion of contaminated air under the insulator also occurs regardless of the intactness of the thermal insulator jackets. As a result, the corrosivity of the condensed water under the insulation increases with time.

Some steel components under thermal insulation may be protected by temperature resistant di-electric coatings. Various types of applied di-electric liquid coatings have been developed to handle high temperatures to some extent. To apply these liquid coatings, the steel surface preparation is the most critical part of the process. Blasting is required to remove contaminants, such as chlorides and other salts, and to provide the proper anchor pattern for the coating. However, because most thermally insulated components are located in hazardous areas, such surface preparation must be conducted with safety and environmental constraints. The surface preparation using blasting method is not feasible in highly congested pipeline areas because there is not enough room for the blasting work in confined spaces. If the coating is damaged for any reason, it cannot protect the exposed steel, resulting in corrosion pits.

Recently, thermally sprayed aluminum coatings using 1100 aluminum alloy were used to protect steel components from CUI. The passive film on the aluminum coating protects the substrate steel as a barrier coating. Aluminum is known to provide galvanic cathodic protection anode when sufficient chlorides exist in the electrolyte (e.g. seawater) because they break the passive film on the aluminum surface. When the aluminum passive film is disrupted, the potential of the aluminum shifts in more negative direction and can protect the steel by galvanic cathodic protection. When the electrolyte for CUI does not contain sufficient chlorides, the aluminum sprayed coating cannot protect the substrate steel as a galvanic anode at low temperatures. In addition, when the sprayed aluminum coating is exposed to highly chloride contaminated CUI electrolyte, the coating turns to sacrificial anode. The coating is then consumed from the exposed surface by self-corrosion, resulting in shorter life.

In addition, similar to liquid coating, the steel surface preparation using blasting is essential for bonding thermal sprayed aluminum coating. The application of thermal sprayed aluminum requires a skilled technician because the speed of spray gun movement, maintaining proper spraying distance and angles, aluminum wire feeding speed, etc., are important considerations. When the structures are located in fire hazardous area, the working area must be shut down during the application. In some congested areas, it is not even possible to apply the coating on site. As a result, the cost of the application is extremely high.

Zinc-rich primers and di-electric coatings may be used together. When the steel surface is exposed, the zinc-rich primer provides galvanic protection. However, the typical life of zinc-rich primer is short in highly corrosive electrolytes because zinc exhibits a low electrical capacity. In addition, the zinc particles in the primer are rapidly consumed in high-temperature electrolytes. When a sufficient amount of zinc particles in the primer are consumed, they can no longer protect a steel substrate. As such, the corrosion protection afforded by zinc rich primer is limited due to the short life.

Commonly, steel hot water tanks are galvanically protected using magnesium anodes, because it was thought any other sacrificial anodes, such as zinc and aluminum, could not provide protection in chloride-free water. However, the efficiency of a magnesium anode is typically less than 50 percent, and even less in chlorinated water due to the self-corrosion.

SUMMARY OF THE INVENTION

This invention resides in the discovery that aluminum becomes active above 75° C. in chloride-free neutral pH water. By combining sacrificial aluminum and sacrificial zinc or zinc-aluminum powders in a mixed primer, long-term, effective corrosion control of steel under thermal insulation can be achieved in all water temperature ranges (0 to 100° C.) regardless of the presence of sufficient chlorides. In the preferred embodiment, the sacrificial aluminum is provided in the form of a tape. Alternatively, the galvanic aluminum layer may be provided in the form of an aluminum-rich primer or an aluminum-based coating.

When the steel temperature is operated below about 75° C., or at low temperature operation periods of cyclic temperature, pipelines or equipment, the zinc powder in the primer protects the steel from corrosion. When the steel is operated above about 75° C., the aluminum powder in the primer and aluminum tape acts to protect the steel. The aluminum powder and sacrificial aluminum can also minimize the consumption of the zinc powder in the primer because the higher active (more negative potential) of aluminum also protects the zinc. As a result, the life of the zinc powder in the primer is extended. If the water for CUI is contaminated with sufficient chlorides, the aluminum powder in the primer and the galvanic aluminum tape become active in all temperature ranges to protect the steel under thermal insulation.

The invention may also take advantage of corrosion resistant aluminum tape to protect the galvanic aluminum tape and the galvanic zinc or zinc-aluminum powder in the primer in areas where the tape system is not damaged. To minimize the self-corrosion of galvanic elements from the corrosive CUI electrolyte, corrosion resistance aluminum tape provides an environmental seal. In an alternative embodiment, such a seal can also be achieved with a di-electrical coating or other corrosion resistance metals.

By combining the characteristics of zinc and aluminum, a triple layered corrosion protection system is provided. With the discovery of advantageous aluminum behavior in hot water without chlorides, pure aluminum and aluminum alloys can be used. Due to the higher electrical capacity of aluminum and significantly lower self-corrosion, a cost-effective galvanic cathodic protection can be achieved.

DETAILED DESCRIPTION OF THE INVENTION

This invention resides in systems and methods for controlling the corrosion of steel structures under thermal insulation, whether operating at low, high or cyclic high-and-low temperatures. The invention is based on the discovery that when an aluminum passive film is disrupted above 75° C. in chloride-free fresh water, the potential of the pure aluminum or alloy shifts in a more negative direction, and can therefore be used as a galvanic anode in chloride-free fresh water above 75° C. By combining pure zinc and pure aluminum or aluminum alloys, the protection system and method provide effective protection of steel from CUI in all temperature ranges of water, from freezing to boiling.

A basic system for controlling steel corrosion under insulation (CUI) comprises a sacrificial anode primer 5 disposed on a steel surface 6 to be protected, and a sacrificial aluminum or zinc layer 4 disposed over the sacrificial anode primer 5. The primer is a zinc-primer. When the pipeline is operated below 75° C., a zinc-only primer may be used. When the operating temperatures above 75° C., aluminum is added to the zinc-rich primer, with the Al to Zn ratio being dependent upon operating temperature. A typical inorganic zinc-rich primer contains zinc silicate as a binder (adhesive) which can be used up to 400° C. Water-based inorganic zinc-rich primers may alternatively be used.

Figure 1:
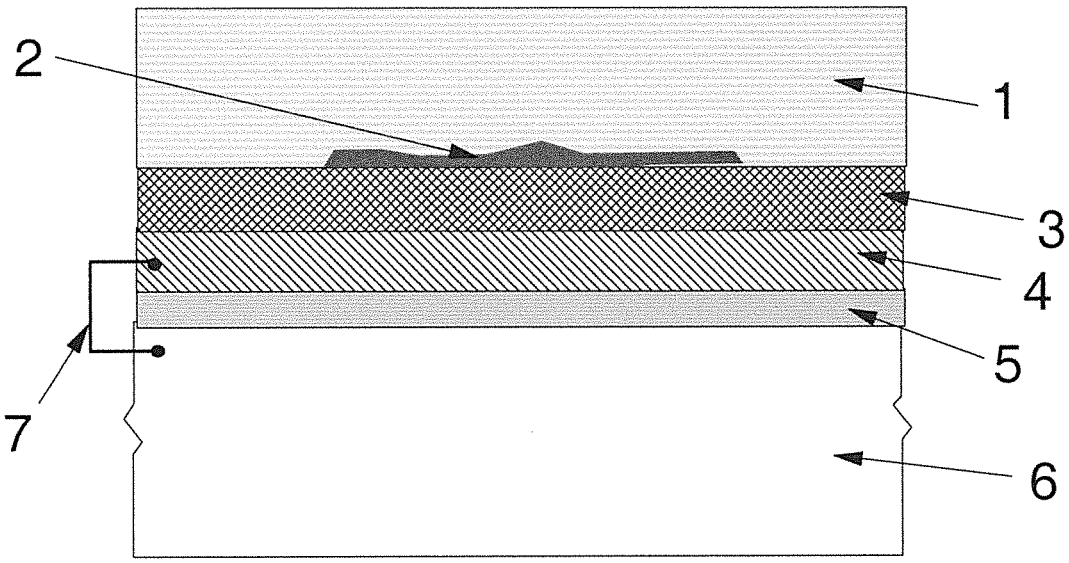
FIG. 1 is a drawing that shows a triple corrosion protection system in accordance with the invention.
Figure 2:
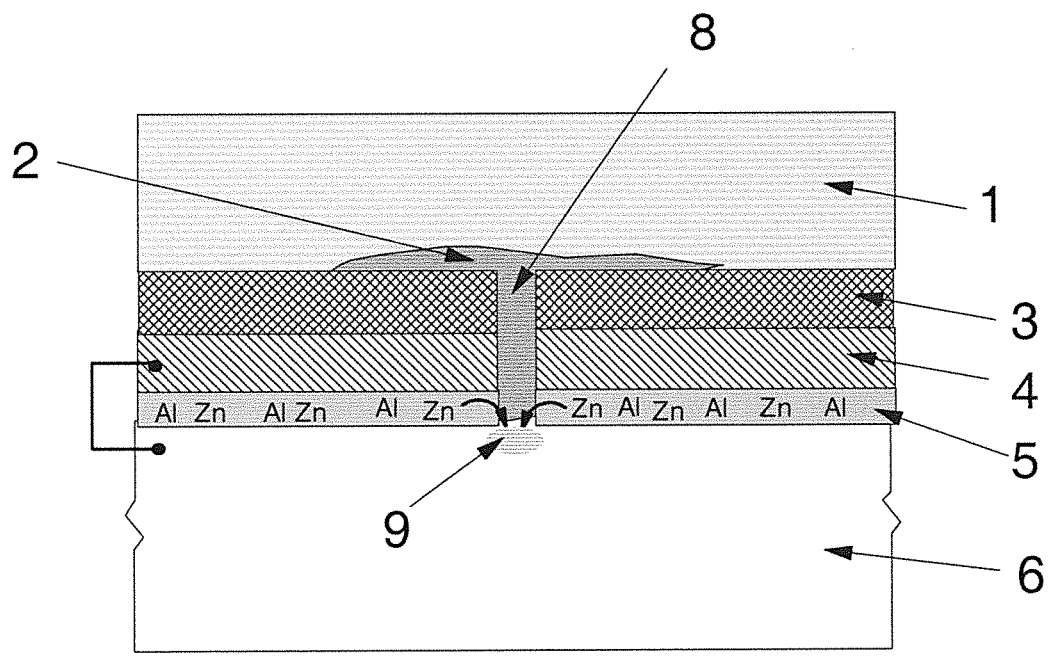
FIG. 2 illustrates the protection mechanism below 75° C. at a tape damaged area.
Figure 3:
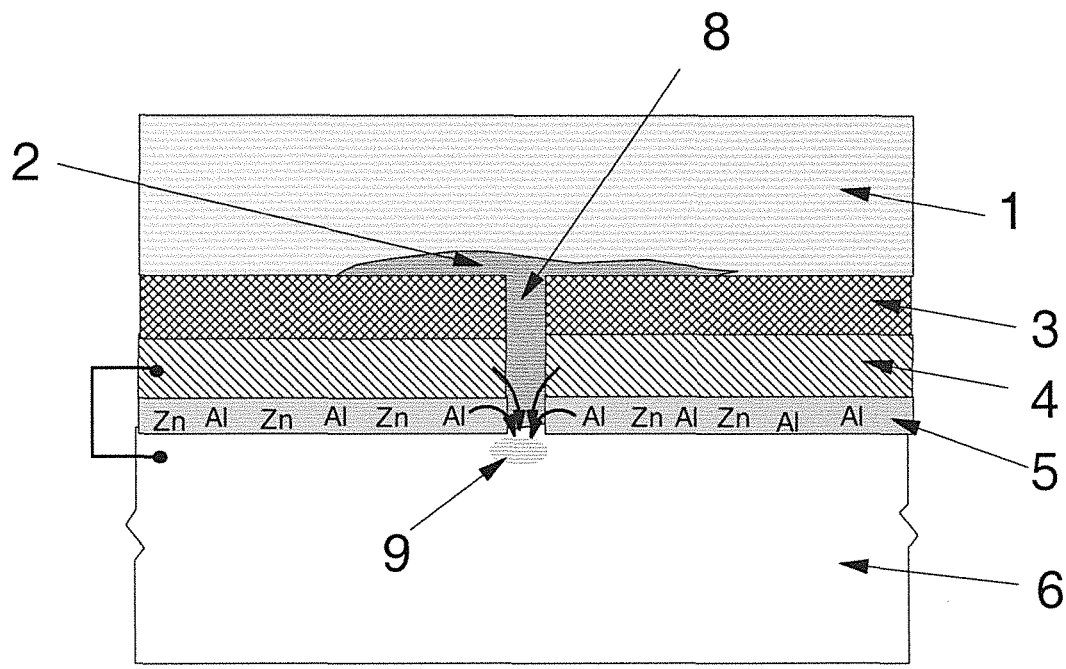
FIG. 3 illustrates the protection mechanism above 75° C. at a tape damaged area.
Figure 4:
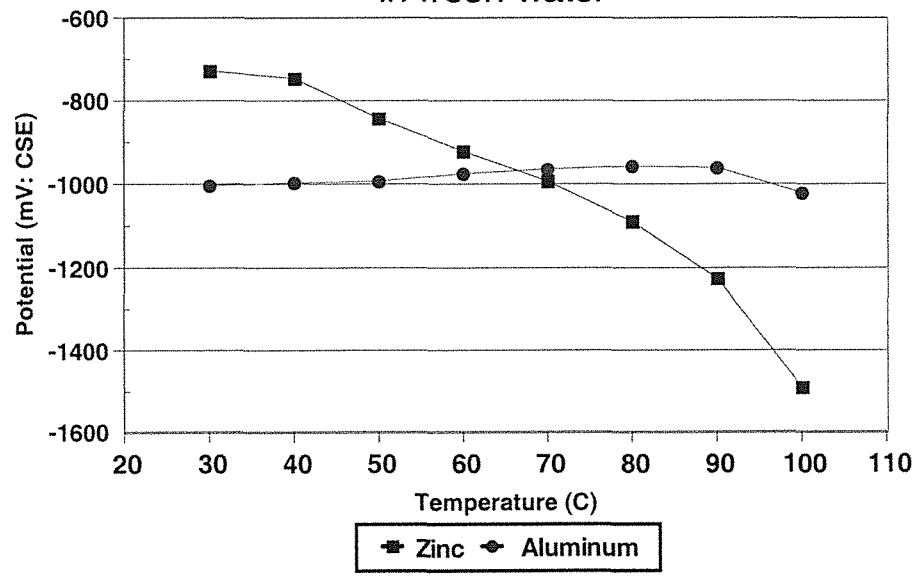
FIG. 4 shows the potential of pure zinc and pure aluminum in chloride free fresh water at various temperatures.

An optional corrosion-resistant layer 3 disposed over the sacrificial aluminum or zinc layer provides a third layer of protection. FIG. 1 is a drawing that shows a triple layered corrosion protection system in accordance with the invention. FIG. 2 illustrates the protection area 9 below 75° C. at a tape damaged area 8, and FIG. 3 illustrates the protection area 9 above 75° C. Water is shown at 2, and 7 is an electrical connection.

When the steel temperature is below 75° C., the pure aluminum or aluminum alloys passivate. As a result, the aluminum cannot be used as a galvanic anode to protect steel when the electrolyte is not contaminated with sufficient chlorides. However, the pure zinc particles in the zinc-rich primer are active in chloride-free neutral pH water in all temperatures (0 to 100° C.). Although the zinc is consumed rapidly in higher temperatures and chloride contaminated water, by combining the zinc with more negative potential aluminum above 75° C., the zinc is partially protected by the aluminum. This can be achieved by adding aluminum powder into a inorganic zinc rich primer. Alternatively, this can be achieved with pure aluminum or galvanic aluminum tape covering the zinc primer.

In steel pipes which include T-sections or other more complex configurations, tape coating s may be problematic. In such instances, aluminum powder loaded primers (like zinc rich primers) may be used. A zinc-rich primer or zinc-aluminum mixed primer may be applied initially, and then covered with a high content of aluminum primer.

Thus, summarizing, at temperatures below 75° C., the zinc particles in the primer act to protect the substrate steel. In temperatures above 75° C., the aluminum particles in the primer, and galvanic aluminum tape protect the substrate steel in chloride free neutral pH water and also reduce the consumption of zinc particles in the primer. When the electrolyte water for CUI is sufficiently contaminated with chlorides, the aluminum particles in the primer and the galvanic aluminum tape become active in all temperatures and protect the steel any temperatures.

Aluminum alloy 3000 and 6000 series are known to be corrosion resistant alloys. To extend the lives of the primer and the galvanic aluminum tape, corrosion resistant aluminum tapes composed of such alloys may be used to cover over the galvanic aluminum tape. Such an arrangement prevents the corrosion of the outer layer of the galvanic aluminum tape and the primer from the highly corrosive CUI electrolyte.

Dielectric coatings may also be used to protect the sacrificial aluminum tape. When the corrosive electrolyte water gets under the barrier corrosion resistance aluminum tapes from the damaged areas or seams between the aluminum tapes, the aluminum-zinc mixed primer and the galvanic aluminum tape acts to protect the steel substrate from corrosion.

The steel surface preparation for the primer is not critical because the steel surface is protected by galvanic current, not by coating. Steel corrosion products—rust—is sufficiently ionically conductive to conduct the galvanic current to the substrate steel. Therefore, the steel surface preparing for the galvanic primer can be achieved by metal wire brushing, thereby significantly reducing the cost of surface preparation.

Sacrificial magnesium anodes have traditionally been used in chloride-free water. However, the life of a magnesium anode in water is short due to the high percentage of self-corrosion. Indeed, the consumption rate of self-corrosion in chlorinated water is as high as 70 percent. By taking advantage of the behavior of pure aluminum or aluminum alloys which become active in neutral pH water above 75°

C., aluminum can instead be used as a sacrificial anode, which has much higher electrical capacity than a magnesium anode.

I claim:

1. A system for controlling steel corrosion under insulation (CUI), comprising:
    a sacrificial zinc anode primer disposed on a steel surface to be protected;
    a sacrificial pure aluminum tape disposed over the sacrificial zinc anode primer;
    wherein the sacrificial pure aluminum tape is in direct electrical communication with the steel through an electrical connection that bypasses the sacrificial zinc anode primer; and
    a corrosion-resistant tape disposed over the sacrificial pure aluminum tape.

2. The CUI protection system of claim 1, wherein the sacrificial zinc anode primer also includes aluminum, or alloys thereof, to control the consumption rate of the sacrificial zinc anode primer at temperatures above a predetermined operating temperature.

3. The CUI protection system of claim 1, wherein the sacrificial zinc anode primer includes pure, elemental zinc particles.

4. The CUI protection system of claim 1, wherein the sacrificial zinc anode primer includes pure, elemental aluminum particles.

5. The CUI protection system of claim 1, wherein the sacrificial zinc anode primer includes aluminum alloy particles.

6. The CUI protection system of claim 1, wherein the sacrificial zinc anode primer includes zinc-aluminum alloy particles.

7. The CUI protection system of claim 1, wherein the corrosion-resistant layer is an aluminum alloy layer.

8. The CUI protection system of claim 7, wherein the aluminum alloy layer is a 3000 series aluminum alloy.

9. The CUI protection system of claim 1, wherein the corrosion-resistant layer is a dielectric layer.

* * * * *